United States Patent [19]
Ono et al.

[11] Patent Number: 5,734,537
[45] Date of Patent: Mar. 31, 1998

[54] TAPE GUIDE STRUCTURE OF ROTARY HEAD DRUM IN RECORDING/ REPRODUCTION APPARATUS AND METHOD OF MACHINING THE SAME

[75] Inventors: Seiji Ono, Yokosuka; Kenmei Masuda, Yokohama; Hidekazu Takeda, Hiratsuka; Atsushi Inoue, Chigasaki; Nobuo Masuoka, Yokohama; Noboru Katohno, Mito; Makoto Ibe; Kuniaki Hirayama, both of Hitachinaka; Kiyokazu Watanabe, Ibaraki-ken, all of Japan

[73] Assignee: Hitachi, Ltd., Tokyo, Japan

[21] Appl. No.: 652,271

[22] Filed: May 23, 1996

[30] Foreign Application Priority Data

May 29, 1995 [JP] Japan ................. 7-130734

[51] Int. Cl.$^6$ ........................... G11B 15/61
[52] U.S. Cl. .............................. 360/130.23
[58] Field of Search .................. 360/130.23, 130.24

[56] References Cited

FOREIGN PATENT DOCUMENTS

| | | |
|---|---|---|
| 63-209055 | 8/1988 | Japan . |
| 4-205844 | 7/1992 | Japan ............ 360/130.24 |
| 6-84244 | 3/1994 | Japan . |
| 6-162627 | 6/1994 | Japan ............ 360/130.24 |

*Primary Examiner*—Robert S. Tupper
*Attorney, Agent, or Firm*—Evenson, McKeown, Edwards & Lenahan, P.L.L.C.

[57] ABSTRACT

In a rotary head drum of a recording/reproduction apparatus, for smoothly holding a magnetic tape over a guide step provided on a lower drum to guide the magnetic tape, part of a chamfer formed in the guide step is formed as a large chamfer in which a chamfered amount is larger than that of the remaining part of the chamfer. With the provision of the large chamfer, even if the lower edge of the magnetic tape deviates from the guide step when the tape is wound over or unwound from the drum, damages of the magnetic tape can be prevented. Therefore, the position and attitude control of tape withdrawing members can be greatly simplified and the magnetic tape can always run stably while being restricted in its position by the guide step. In the process of machining a tape running surface on the drum, by increasing the feed distance of a blade in the part of the chamfer where the large chamfer is to be formed by chamfering the guide step with a large chamfered amount, in comparison with the feed distance set in the remaining part of the chamfer, the large chamfer and the small chamfer can be both machined at the same time, resulting in simplified machining steps.

17 Claims, 9 Drawing Sheets

TAPE GUIDE STRUCTURE OF ROTARY HEAD DRUM IN RECORDING/ REPRODUCTION APPARATUS AND METHOD OF MACHINING THE SAME

BACKGROUND OF THE INVENTION

The present invention relates to a rotary head drum used in recording/reproduction apparatus such as VTR's (video tape recorder) for professional and home use, and more particularly to the structure of a guide provided on a lower drum for guiding a tape, and a method of machining the tape guide structure.

One of important matters in recording/reproduction apparatus using thin magnetic tape is how to protect the tape when it is loaded or unloaded.

One prior art which have been practiced heretofore for the above matters is disclosed in, e.g., JP-A-63-209055. In this prior art, when a tape is loaded or unloaded, a tape withdrawing member is three-dimensionally moved to adjust a position of the member not only on one horizontal plane but also in height. The magnetic tape is thereby wound over a rotary head drum such that a lower edge of the magnetic tape surely lies on a guide step in its entirety, while the tape is prevented from twisting.

In another prior art disclosed in JP-A-6-84244, a guide step includes a chamfer where a chamfered amount is large along its entirety (hereinafter referred to as a large chamfer). That is, a guide step was previously formed to have a chamfer where a chamfered amount is small along its entirety (hereinafter referred to as a small chamfer). In this prior art, it is intended to increase the chamfered amount along the entirety of the guide step, thereby forming the large chamfer. This allows that even if the lower edge of a magnetic tape deviates from the guide step to overlap an outermost peripheral portion, the portion where the tape lower edge lies over is defined by the large chamfer giving a gentle slope to the surface of the magnetic tape. Therefore, the overlapping portion of the magnetic tape is less curved to prevent damages of the magnetic tape. As a result, when the tape is loaded or unloaded, a tape withdrawing member can be required only to move on one horizontal plane, and hence control in its position and attitude can be moderated.

SUMMARY OF THE INVENTION

The following matters are not described in any prior art stated above.

In the present invention, the analysis and evaluation are first carried out for protecting a magnetic tape so as to find the following fact.

In a recording/reproduction apparatus for use with the present invention, as shown in FIG. 8, when a cassette 1 is loaded, a magnetic tape 3 within the cassette 1 is withdrawn by tape withdrawing members 6 to a predetermined position and obliquely wound over a rotary head drum 2 to define a tape running path as shown in the drawing along which the magnetic tape 3 runs successively. A rotary magnetic head (not shown) disposed on the rotary head drum 2 scans the running magnetic tape 3, whereupon information signals are recorded on oblique tracks on the magnetic tape 3.

The rotary head drum 2 comprises, as shown in FIG. 9, an upper drum 13 and a lower drum 7 which have each a cylindrical shape and are coaxially arranged so as to face each other with a predetermined gap left therebetween. In order to form oblique tracks on the magnetic tape 3 as stated above, the magnetic tape 3 is obliquely run on outer peripheral surfaces of the upper drum 13 and the lower drum 7.

For causing the magnetic tape 3 to run along a certain tape running path, the lower drum 7 is provided on its outer peripheral surface with a guide step 4 extending along the tape running path. The tape withdrawing members 6 for withdrawing the magnetic tape 3 from the cassette 1 to the rotary head drum 2 are each strictly calculated in position after withdrawing the tape, inclined direction and inclined angle, and are mounted and adjusted on the basis of calculated results so that the magnetic tape 3 is surely brought into contact with the rotary head drum 2 along the guide step 4.

Particularly in VTR's which use a thin magnetic tape 3 for the purposes of reduction in size and longer-time recording, it is important to prevent excessive forces from being applied to the magnetic tape 3 thereby protecting the magnetic tape 3. In many of home-use VTR's, the upper and lower drums of the rotary head drum 2 are designed to have a smaller diameter for reduction in size. Correspondingly, the magnetic tape 3 used in those VTR's is as very thin to have a thickness of about 7 μm and has very small bending rigidity.

It has recently been found that when a tape is wound over or unwound from the rotary head drum 2, i.e., when the magnetic tape 3 is loaded or unloaded, the lower edge of the magnetic tape 3 may be brought into contact with or overlap a drum's outermost peripheral surface 19 adjacent to the guide step 4 of the lower drum 7 as shown in FIG. 10 and, therefore, the magnetic tape 3 is liable be damaged.

That is, the guide step 4 of the lower drum 7 is formed spirally so as to increase a distance from the top surface of the lower drum 7 to the guide step 4 at a constant rate along the guide step 4, and the rotary head drum 2 is mounted on a chassis 5 in such an inclined state that the guide step 4 lies horizontally. Looking at the guide step 4 from a side of the cassette 1, therefore, the guide step 4 should appear as a horizontal linear line as indicated by a broken line 4' in FIG. 9. In fact, however, the guide step. 4 appears as a very slightly undulating line substantially in a form of a sinusoidal wave as indicated by a solid line 4 in FIG. 9.

On the other hand, the cassette 1 is loaded to position horizontally. Accordingly, if the guide step 4 appears as a horizontal linear line as indicated by the broken line 4' in FIG. 9 when viewed from the side of the cassette 1, the magnetic tape 3 can be wound over the rotary head drum 2 while the lower edge of the magnetic tape 3 is aligned with the guide step 4 with good accuracy, merely by operating the tape withdrawing members 6 so as to move on the same horizontal plane after withdrawing the magnetic tape 3 from the cassette 1, on condition that the height of the cassette 1 in its loaded state is designed to a predetermined level.

But, in a practical condition where the guide step is undulating as indicated by the solid line 4 in FIG. 9, when the magnetic tape 3 is withdrawn by the tape withdrawing members 6 and wound over the rotary head drum 2 as mentioned above, the lower edge of the magnetic tape 3 abuts on an upwardly raising portion of the guide step 4. Further, when the magnetic tape is pressed against an outer peripheral surface (tape running surface) of the lower drum 7 above the guide step 4, the lower edge of the magnetic tape 3 is positioned to lie over the outermost peripheral surface 19 of the guide step 4 as shown in FIG. 10.

Even in such an overlapping state, when the magnetic tape 3 starts running, the lower edge of the magnetic tape 3 lying over the outermost peripheral surface 19 is also eventually forced to run on the guide step 4. During a period until the tape is so normally positioned, however, the lower edge of the magnetic tape 3 is pulled while being bent, and hence the magnetic tape 3 is damaged. The magnetic tape 3 is damaged more badly as its thickness is thinner.

In view of the above analysis results, the foregoing two prior art techniques have been evaluated in detail. The evaluation has resulted as follows.

As a result of actually designing a recording/reproduction apparatus in accordance with the prior art disclosed in the above-cited JP-A-63-209055, the following problem has been found. The rotary head drum is mounted on a chassis in an inclined state, and the path of movement of each tape withdrawing member must be disposed so that the tape withdrawing member will not interfere with other members when the magnetic tape is wound over or unwound from the rotary head drum. It is therefore very difficult to perform control of the position and attitude of the tape withdrawing member during the movement thereof.

Also, as a result of manufacturing a rotary head drum and mounting it on a recording/reproduction apparatus in accordance with the prior art disclosed in the above-cited JP-A-6-84244, the following problem has been found. The guide step 4 has a narrow width along its entirety due to the presence of a large chamfer 22' (indicated by a one-dot-chain line in FIG. 10) and, therefore, stability of the magnetic tape 3 on the guide step 4 is impaired. When the running speed of the magnetic tape 3 is changed in playback operation, for example, when the mode is shifted from fast playback to normal playback or forward playback to backward playback, the tension of the magnetic tape 3 is momentarily changed at the time of the mode shift. This makes the lower edge of the magnetic tape 3 tend to slip out of the guide step 4 and disorders a reproduced image.

With a view of solving the problems as set forth above, an object of the present invention is to provide a tape guide structure of a rotary head drum in recording/reproduction apparatus and a method of machining the same, with which the attitude and position of a tape withdrawing member can be easily controlled when a magnetic tape is loaded or unloaded, while surely protecting the magnetic tape.

To achieve the above object, in a tape guide of a lower drum of a rotary head drum according to the present invention, part of a chamfer formed in a tape guide step of the lower drum is formed as a large chamfer in which a chamfered amount is larger than the remaining part of the chamfer. Specifically, the large chamfer is formed only in the part of the chamfer where a magnetic tape tends to contact or overlap an outer peripheral surface of the lower drum when it is loaded over or unloaded from the rotary head drum.

Further, the tape guide is formed by a method comprising the steps of rotating a blank of the lower drum, feeding a first blade having a predetermined tip angle in the direction parallel to the axis of rotation of the drum blank in synchronization with the rotation of the drum blank, cutting an outer peripheral surface of the drum blank by the first blade to form a tape running surface, and increasing the feed distance of the first blade in the part of the chamfer where the large chamfer having a large chamfered amount is to be formed, in comparison with the feed distance set in the remaining part of the chamfer.

With the tape guide structure according to the present invention, by chamfering the guide step so as to have a large chamfered amount in the region where the magnetic tape tends to overlap the drum's outer peripheral surface, the magnetic tape can be smoothly loaded on the tape guide when it is wound over the rotary head drum, and also smoothly unloaded from the tape guide when it is unwounded from the drum. Accordingly, excessive force is not applied to the magnetic tape abruptly and hence the magnetic tape can be protected. Furthermore, because the magnetic tape can be wound or unwound with no need of consideration on how to prevent the tape from overlapping the drum's outer peripheral surface, it is also possible to simplify the paths along which tape withdrawing members are moved. In addition, because the large chamfer where the chamfered amount is large is formed only in part of the (small) chamfer formed in the guide step, the guide step still has a region having a wide width. Therefore, the magnetic tape is guided in a stable state by the guide step and will not slip off from the guide step.

With the method of machining the tape guide according to the present invention, the large and small chamfers can be formed with the reduced cost and high accuracy.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Preferred embodiments of the present invention will be described hereinafter.

Figure 1:
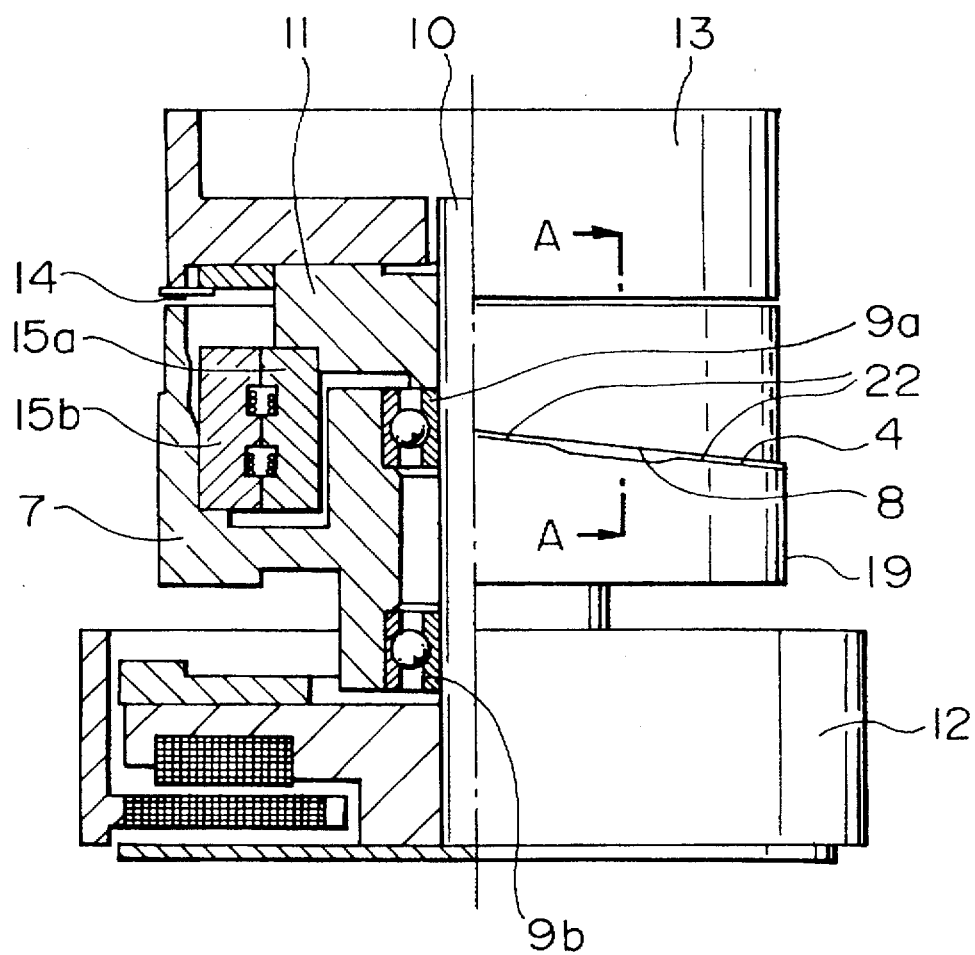
FIG. 1 is a side view, partly in section, showing an embodiment of a tape guide on a drum of a rotary head drum according to the present invention.

FIG. 1 shows an embodiment of a tape guide on a drum of a rotary head drum according to the present invention.

Denoted by reference numeral 4 is a guide step, 7 is a lower drum, 8 is a large chamfer, 9a, 9b are bearings, 10 is a shaft, 11 is a disk, 12 is a motor, 13 is an upper drum, 14 is a magnetic head, 15a, 15b are transformers, 19 is a drum's outer peripheral surface, and 22 is a small chamfer.

In FIG. 1, the shaft 10 is mounted in the lower drum 7 through the bearings 9a, 9b. The shaft 10 is press-fitted into an opening in a disk 11 fixed to an inner lower surface of the upper drum 13, and is driven by the motor 12 to rotate at a high speed. The upper drum 13 and the lower drum 7 are coaxially disposed on the shaft 10 so as to face each other with a predetermined gap left therebetween.

A magnetic head 14 is mounted on the upper drum 13 which is attached to the disk 11. The magnetic head 14 is slightly projected outward from the gap between the upper drum 13 and the lower drum 7, and scans obliquely a magnetic tape 3 running along the guide step 4 of the lower drum 7 so that signals are recorded on the magnetic tape 3 in the form of oblique tracks, or signals recorded in the form of the oblique tracks are reproduced. The reproduced signals are transmitted to a signal processing circuit (not shown) through the rotary transformer 15a fixed to the disk 11 and the rotary transformer 15b fixed to the lower drum 7. In a recording mode, conversely, signals are supplied from the not-shown signal processing circuit to the magnetic head 14 through the rotary transformers 15a, 15b.

Figure 10:
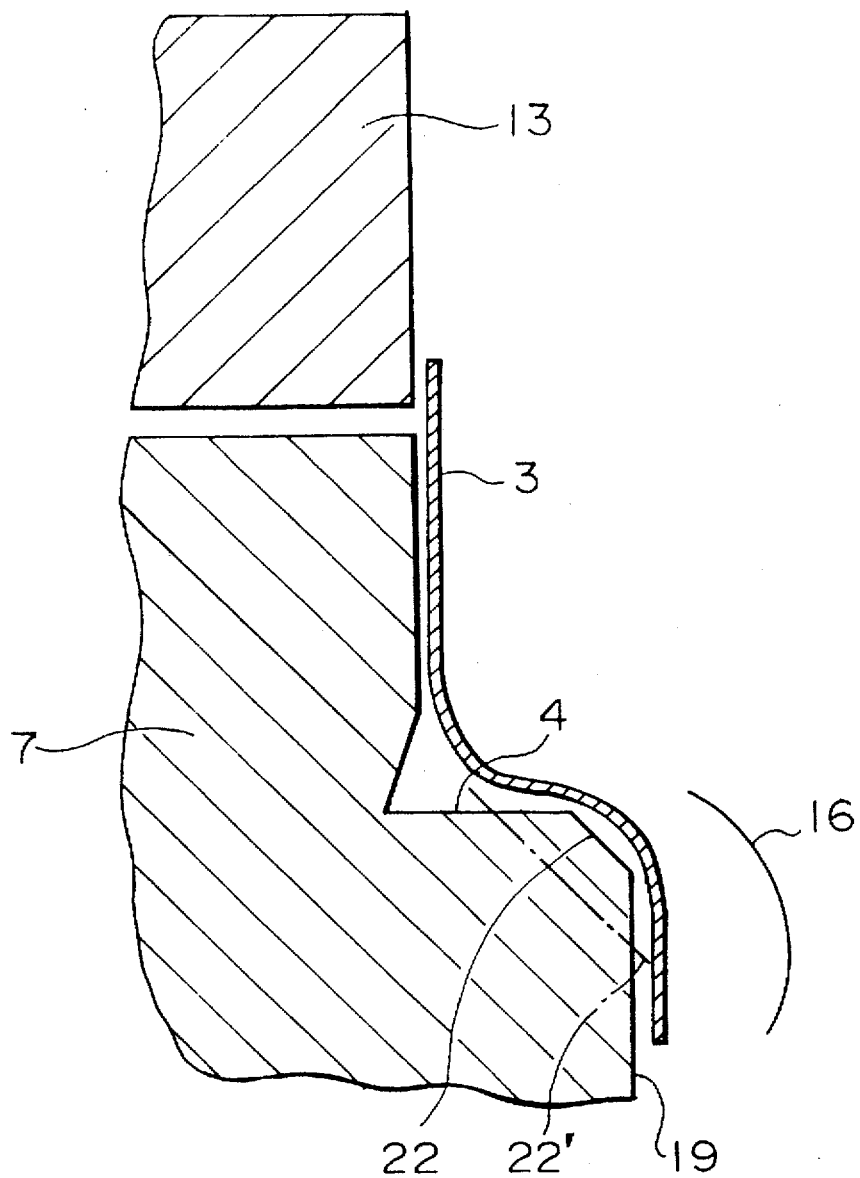
FIG. 10 is a side sectional view showing a state of a magnetic tape overlapping the tape guide step of a rotary head drum, the view being used for the analysis on which the present invention is based.

The lower drum 7 is provided in its outer peripheral surface with the guide step 4 inclined a predetermined angle relative to the shaft 10, the guide step 4 including the small chamfer 22. The large chamfer 8 is formed in part of the small chamfer 22, particularly in a part where the magnetic tape tends to overlap the drum's outer peripheral surface 19 when it is loaded and unloaded. The large chamfer 8 is located in a raised portion of the guide step 4 as previously shown in FIG. 10.

Figure 2:
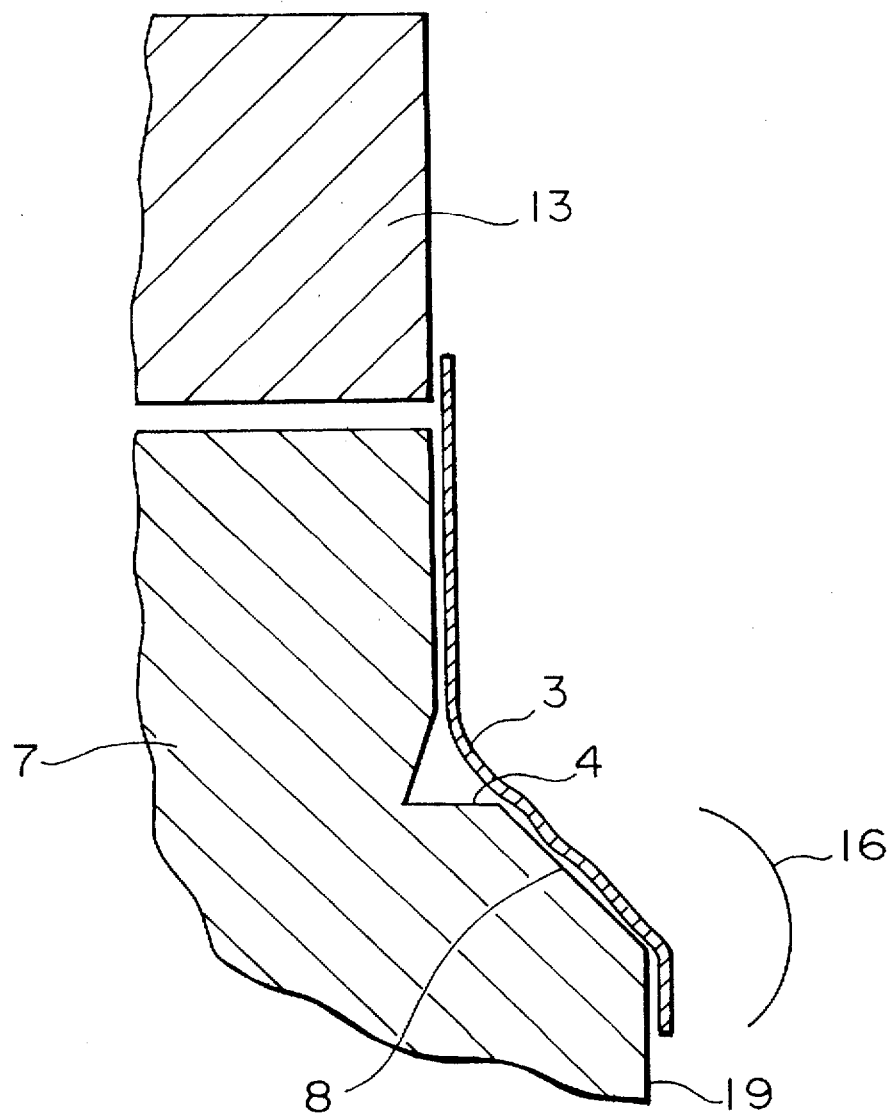
FIG. 2 is a sectional view taken along the line A—A in FIG. 1.

FIG. 2 is a sectional view taken along the line A—A in FIG. 1. In FIG. 2, denoted by 16 is a tape overlapping portion and the components corresponding to those in FIG. 1 are denoted by the same reference numerals.

Referring to FIG. 2, the large chamfer 8 is formed in the guide step 4 and inclined at a predetermined angle. Even if the magnetic tape 3 is moved to overlap the drum's outer peripheral surface 19 when it is loaded and unloaded, the magnetic tape 3 lies over the large chamfer 8 where the width of the guide step 4 vertical to the drum's outer peripheral surface 19 is narrow and which is inclined with respect to the drum's outer peripheral surface 19. This prevents the magnetic tape 3 from deforming rapidly and hence reduces stresses generated in the tape. Therefore, a complex control scheme is not required to control the attitude of tape withdrawing members 6.

Further, at opposite ends of the large chamfer 8, the chamfered amount in the guide step is gradually reduced for smooth transition to the small chamfer 22.

Accordingly, even if the magnetic tape 3 is moved to overlap the large chamfer 8 when loading or unloading the magnetic tape, the magnetic tape 3 will not be damaged and the tape withdrawing members can be moved with no need of complex attitude control when the magnetic tape 3 is loaded or unloaded.

In addition, since the large chamfer 8 is formed in part of the guide step 4, a circumferential range where the width of the guide step 4 is narrowed due to the presence of the large chamfer 8 is only that part of the guide step 4. As a result, even if the speed of the magnetic tape 3 is changed during its running and so the tape tension is changed, the magnetic tape is stably guided by the guide step 4 and is prevented from slipping off from it.

Figure 3:
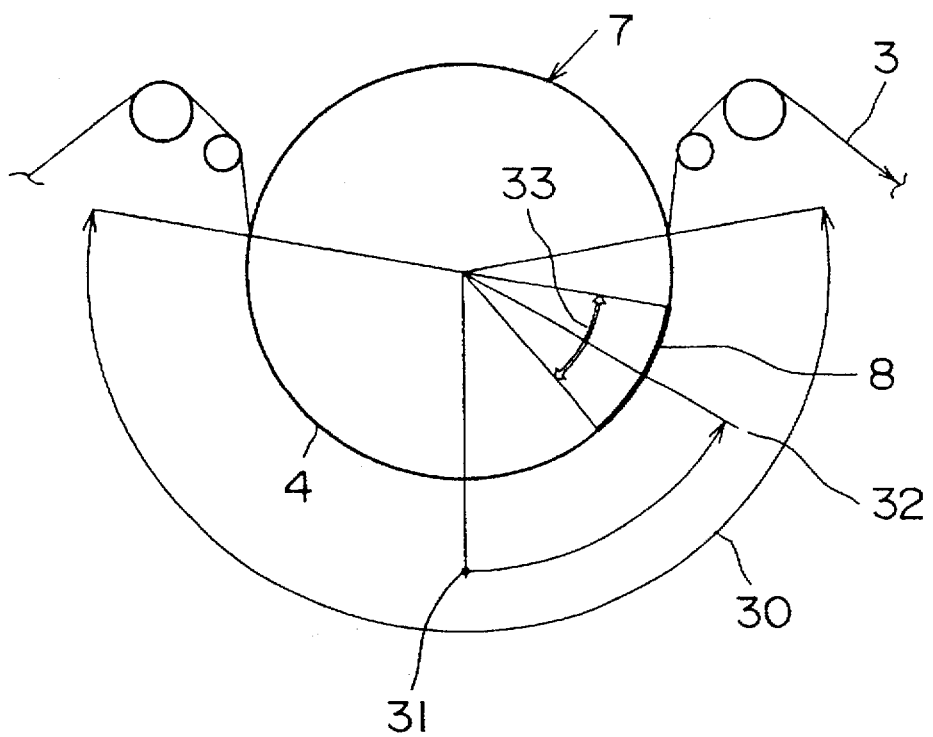
FIG. 3 is a plan view showing a range where a large chamfer is formed in the tape guide according to the present invention.

The term "part of the guide step 4" used herein means the part of the guide step 4 in which the magnetic tape 3 overlaps a rotary head drum 2 during a withdrawing process of the magnetic tape 3 from a cassette on condition that the rotary head drum 2 is mounted onto the cassette loading surface in a state inclined at a predetermined angle. The position where the height of the guide step 4 from the cassette loading surface is maximized is the center of the large chamfer region. In the present invention, as shown in FIG. 3, the large chamfer 8 is formed over the region 33 of approximately ±20° about the point 32 angularly offset approximately 70° from the center 31 of the tape wound region 30 toward the outlet side of the rotary head drum 2, at which point the guide step 4 has the highest level. Further, while the width by which the guide step 4 is projecting from the outer peripheral surface of the lower drum 7 is about 0.15 mm and one side of the edge cut off by the chamfering to form the small chamfer 22 is about 0.03 mm, one side of the edge cut off by the chamfering to form the large chamfer 8 is about 0.13 mm. The advantage of the present invention is effectively achieved if the chamfered amount in the guide step 4 is in the range of 30%–100% with respect to the width where the guide step 4 is projecting from the outer peripheral surface of the lower drum 7, i.e., in the range of about 0.05 mm–0.15 mm for one side of the edge cut off by the chamfering to form the large chamfer 8. Preferably, the chamfered amount in the guide step 4 is in the range of 50%–100% of the width of the guide step 4, i.e., in the range of about 0.08 mm–0.15 mm for one side of the cutoff edge. More preferably, the chamfered amount in the guide step 4 is in the range of 70%–100% of the width thereof, i.e., in the range of about 0.11 mm–0.15 mm for one side of the cutoff edge. If the small chamfer 22 is present on each side of the large chamfer 8, the chamfered amount may be 100 % of the width of the guide step 4, i.e., about 0.15 mm for one side of the cutoff edge. In other words, the width of the guide step 4 may be totally chamfered in such a case.

Thus, with the provision of the large chamfer 8 formed in the tape overlapping portion 16 of the lower drum 7 over which the magnetic tape 3 may move to lie when it is loaded or unloaded, damages of the magnetic tape that are possibly caused due to overlapping with the drum's outer peripheral surface 19 can be lessened.

An embodiment of a method of machining the large chamfer 8 in the guide step 4 according to the present invention will be described below.

Figure 4A:
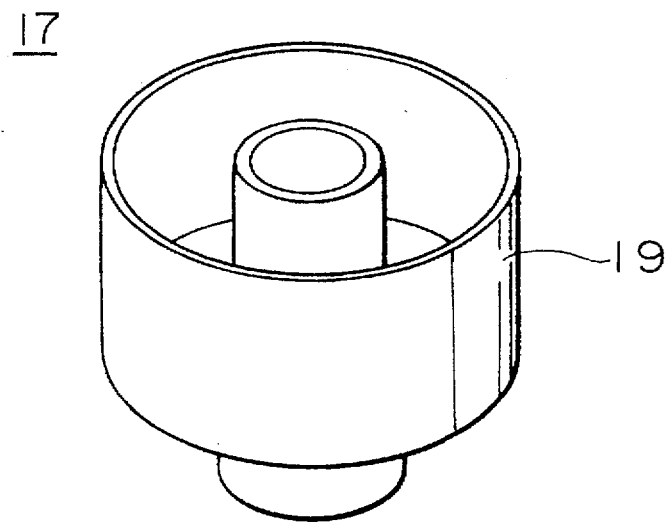
FIGS. 4A and 4B are perspective views showing a blank of the lower drum in the present invention before finish machining and the lower drum after the finish machining, respectively.
Figure 4B:
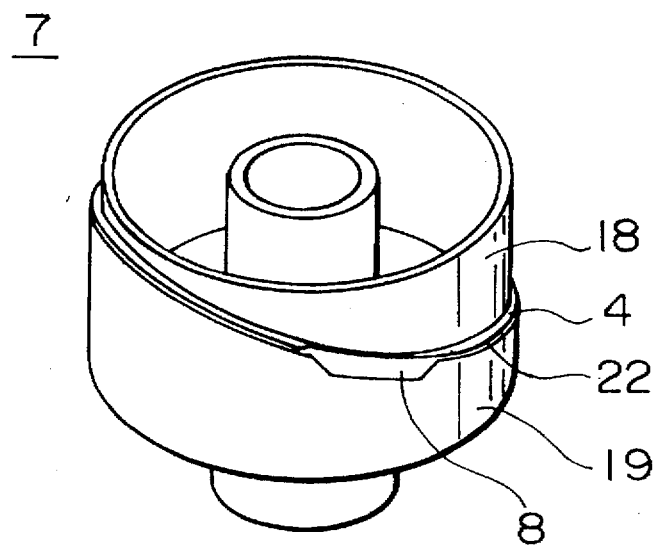

The lower drum is manufactured by surface machining which comprises the steps of pre-machining, running surface machining, and finish machining for the guide step. FIG. 4A is a perspective view showing a blank 17 of the lower drum before the finish machining, and FIG. 4B is a perspective view showing the lower drum 7 after the finish machining.

In such machining, all the required surfaces are cut approximately 0.1 mm with the blank once chucked. Thus, since all the required surfaces are machined with the blank once chucked, the squareness and concentricity of the surfaces are ensured.

Note that the processes for machining the parts other than the tape running surface 18 and the guide step 4 for restricting the tape running position are the same as usually practiced by employing a lathe and, therefore, will not be described here.

Because the magnetic tape 3 is spirally wound over the rotary head drum 2, the tape running surface 18 and the guide step 4 for restricting the tape running path must be machined into the spiral form.

In the finish machining, therefore, the tape running surface 18 and the guide step 4 are machined by spirally moving the position of a blade in synchronization with the rotation of the lathe on which the blank 17 of the lower drum 7 is mounted. The tape running surface 18 and the guide step 4 are thereby formed on the outer peripheral surface 19 of the blank 17 of the lower drum 7.

An embodiment of a machining method of the present invention for forming the large chamfer 8 in part of the small chamfer 22 defined in the guide step 4 will now be described with reference to FIGS. 5A and 5B.

Figure 5A:
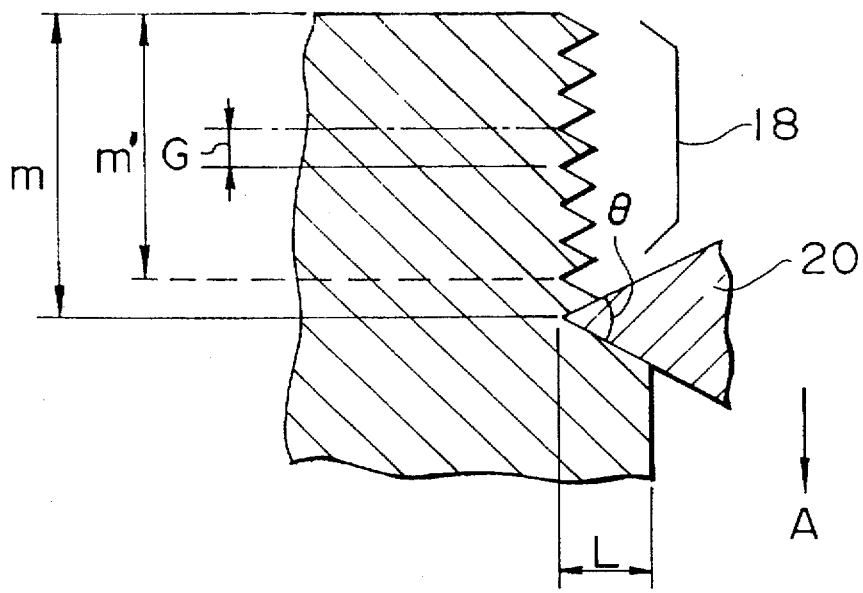
FIGS. 5A and 5B are side sectional views showing an embodiment of a method of machining the tape guide on the lower drum of the rotary head drum according to the present invention.

FIG. 5A shows the process of machining the tape running surface 18 before the formation of the chamfers 22, 8.

Figure 5B:
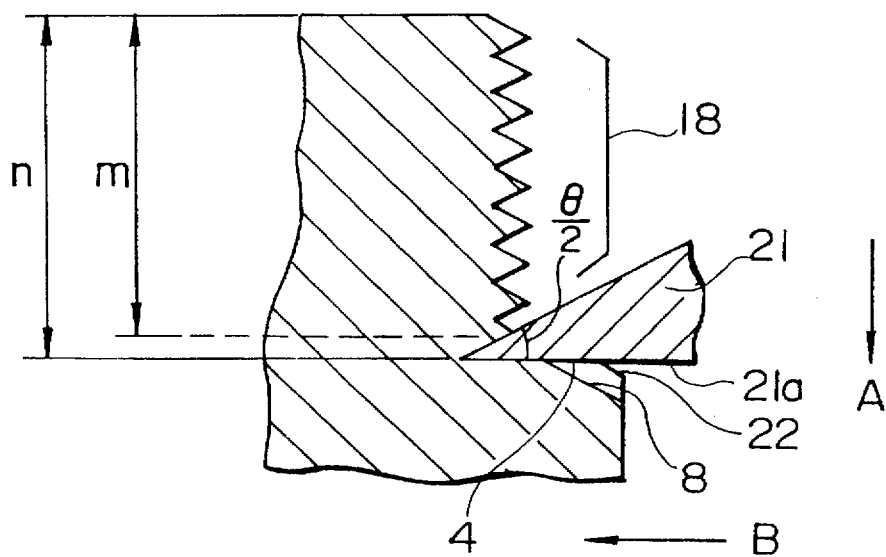

Referring to FIGS. 5A and 5B, the outer peripheral surface 19 of the blank 17 of the lower drum 7 is machined to form the tape running surface 18 by feeding a running surface machining bite 20 having a larger tip angle θ in the direction of arrow A (i.e., in the direction parallel to the center axis of the blank 17) with the depth of cut set to L, while the blank 17 is rotated about its center axis. The surface roughness of the tape running surface 18 is determined depending on both the feed pitch G of the running surface machining bite 20 per rotation of the blank 17 and the tip configuration of the running surface machining bite 20. The tape running surface 18 is formed by feeding the running surface machining bite 20 through a predetermined feed length m. In such a process, it is a matter of course that the feed length m of the running surface machining bite 20 is continuously changed at a constant rate in synchronization with the phase of rotation of the blank 17.

Further, m' represents the feed length of the running surface machining bite 20 when the small chamfer 22 is formed. The feed length m' of the running surface machining bite 20 is also continuously changed at a constant rate in synch with the phase of rotation of the blank 17. Then, in the region where the large chamfer 8 is formed, the feed length of the running surface machining bite 20 is changed to m. Here, there is a relationship of m'<m.

Figure 6:
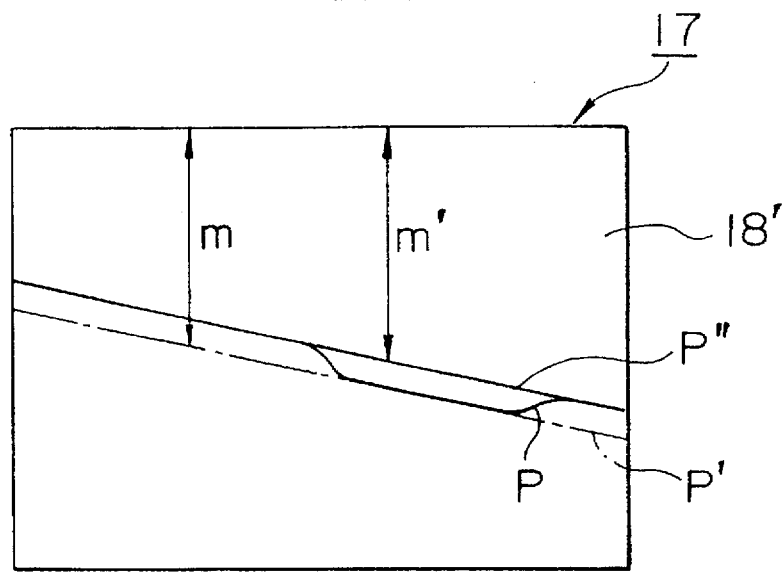
FIG. 6 is a side view showing a region machined by a tape running surface machining bite in the step of machining the tape running surface shown in FIGS. 5A and 5B.

FIG. 6 shows changes, with respect to the rotational angle ψ of the blank 17, in the feed length m of the running surface machining bite 20 when the large chamfer 8 is formed, and in the feed length m' of the running surface machining bite 20 when the small chamfer 22 is formed. Stated otherwise, P' indicates a locus of the lower end in a pre-machined portion 18' defined by the running surface machining bite 20 when the feed length of the running surface machining bite 20 is set to m, and P" indicates a locus of the lower end in the pre-machined portion 18' defined by the running surface machining bite 20 when the feed length of the running surface machining bite 20 is set to m'. Thus, P' and P" indicate loci along which the tip of the running surface machining bite 20 moves during the process shown in FIG. 5A.

Referring to FIG. 6, in the region where the small chamfer 22 is to be formed, the feed length m' of the running surface machining bite 20 is restricted so that the machining is made to the locus P". In the region where the large chamfer 8 is to be formed, the feed length m of the running surface machining bite 20 is restricted so that the machining is made to the locus P'.

Accordingly, when machining the guide step 4 which includes the small chamfer 22 and the large chamfer 8, the lower end of the machined surface 18' must be shifted from the locus P" to P' and then conversely from the locus P' to P" at the respective ends of the large chamfer 8. In addition, such transitions between the loci P' and P" must be not discontinuous but smooth.

To this end, in the region where the small chamfer 22 is to be formed, the running surface machining bite 20 is fed so as to provide the feed length m'. When reaching one end of the region where the large chamfer 8 is to be formed, the feed speed of the running surface machining bite 20 is continuously smoothly increased so that the feed length becomes m. Then, when reaching the other end of the large chamfer 8 and returning back to the region where the small chamfer 22 is to be formed, the feed speed of the running surface machining bite 20 is continuously smoothly reduced so that the feed length becomes m'. As a result, the locus along which the tip of the running surface machining bite 20 moves eventually is given by P.

After that, the running surface machining bite 20 is removed and, as shown in FIG. 5B, a guide step machining bite 21 of which tip lateral edge on the preceding side with respect to the moving direction A of the running surface machining bite 20 is vertical to the tape running surface 18 and which has a tip angle of θ/2, is set up instead of the bite 20 such that its tip is positioned at a predetermined feed length n somewhat greater than the aforesaid feed lengths m, m' from the upper surface of the lower drum 7. Then, the guide step machining bite 21 is fed in the direction of arrow B from the outer periphery of the lower drum 7 toward the axis of the rotation. The lower end of the tape running surface 18 of the lower drum 7 is thereby machined to form the guide step 4 vertical to the tape running surface 18.

The aforesaid length n corresponds to the distance from the upper surface of the lower drum 7 to the guide step 4, and is continuously changed at a constant rate in synchronization with the phase of rotation of the lower drum 7 so that the spiral guide step 4 is formed on the outer peripheral surface of the lower drum.

By so forming the guide step 4, the small chamfer 22 is formed to provide the wide width of the guide step 4 in the region where the feed length of the running surface machining bite 20 is set to m', and the large chamfer 8 is formed to provide the narrow width of the guide step 4 in the region where the feed length of the running surface machining bite 20 is set to m. Thus, both the chamfers 22, 8 are formed at the same time.

Of course, the angles of inclination of the chamfers 22, 8 are determined depending on the tip angle θ of the running surface machining bite 20 and other parameters.

Figure 7:
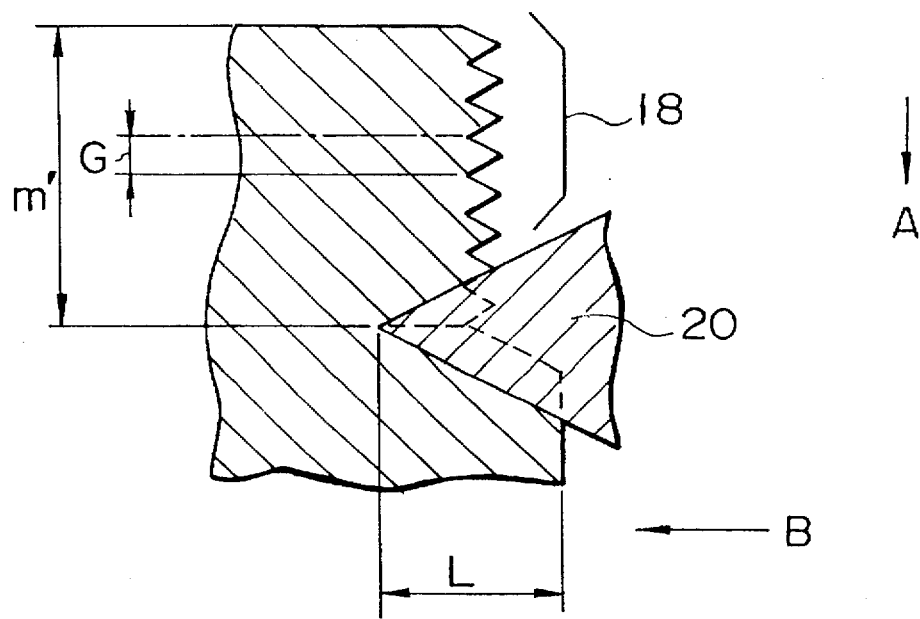
FIG. 7 is a side sectional view showing another embodiment of a method of machining the tape guide on the lower drum in the rotary head drum according to the present invention.
Figure 8:
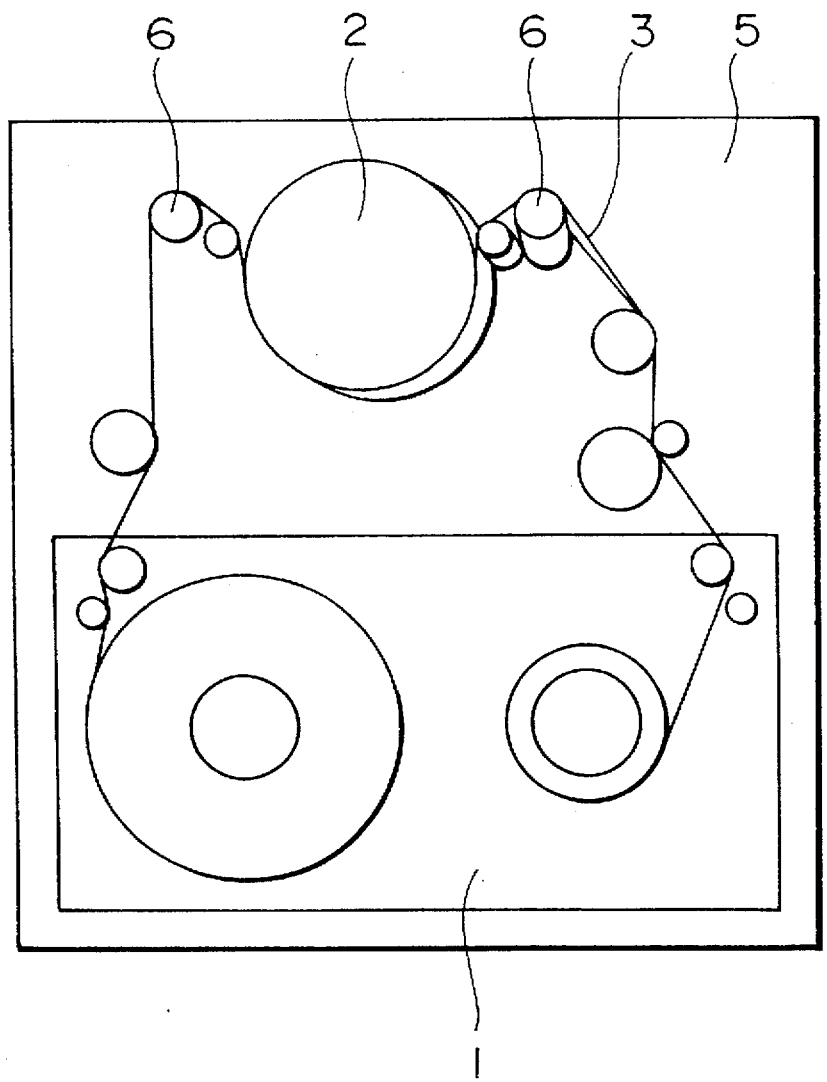
FIG. 8 is a plan view showing a tape running system in a recording/reproduction apparatus for use with the present invention.
Figure 9:
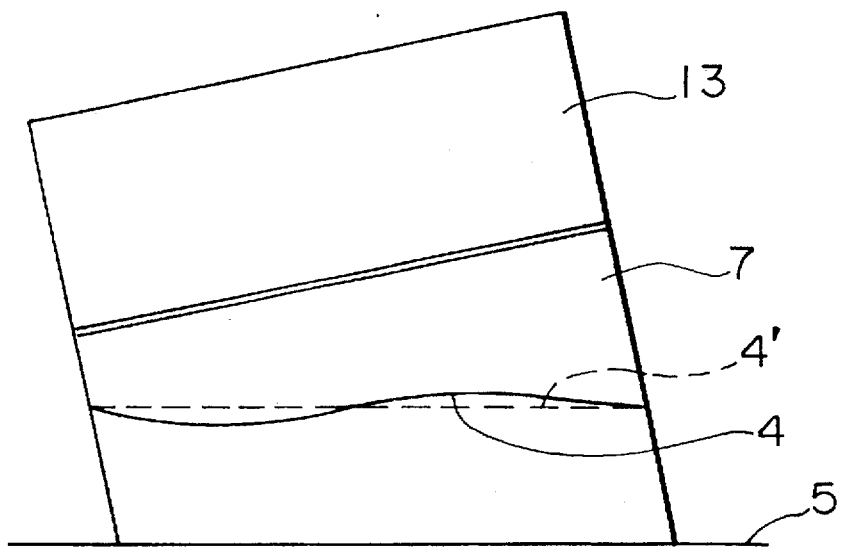
FIG. 9 is a side view schematically showing the configuration of a tape guide step of a lower drum, the view being used for the analysis on which the present invention is based.

FIG. 7 shows another embodiment of the machining method according to the present invention.

In the embodiment shown in FIGS. 5A and 5B, when machining the tape running surface, the feed length of the running surface machining bite 20 is set to m' in the region where the small chamfer 22 is to be formed, and the feed length of the running surface machining bite 20 is increased to m in the region where the large chamfer 8 is to be formed.

By contrast, in this embodiment, the running surface machining bite 20 is fed in the direction of arrow A through the feed length m' which covers all the region on the outer peripheral surface of the blank 17 of the lower drum 7 where the tape running surface 18 and the guide step 4 are to be formed. After the tape running surface 18 has been thus formed, the running surface machining bite 20 is further fed in through a predetermined length L in the direction of rotation axis of the blank 17 (i.e., in the direction of arrow B) in the region where the large chamfer 8 is to be formed, as shown in FIG. 7.

By the above machining of the tape running surface, the outer peripheral surface of the blank 17 is cut to a lower position in the region where the large chamfer 8 is formed than in the region where the small chamfer 22 is formed. This result is the same as resulted from the case explained above with reference to FIG. 5A where the tape running surface is machined with the feed length of the running surface machining bite 20 set to m. Then, by carrying out the process of machining the guide step in a like manner as explained above with reference to FIG. 5B, the small chamfer 22 and the large chamfer 8 are formed at the same along with the guide step 4.

While the embodiments of the method of machining the tape guide according to the present invention have been described, the invention is not limited to the illustrated embodiments. For example, the running surface machining bite 20 is also employed for machining the chamfers in the foregoing embodiments, but the process for machining the chamfers is not limited to the use of the bite 20 and the chamfers may be machined by a specific bite.

With the tape guide on the lower drum of the rotary head drum according to the present invention, even if the lower edge of the magnetic tape deviates from the guide step when the tape is wound over and unwound from the drum, it is possible to prevent damages of the magnetic tape and hence to greatly simplify the position and attitude control of the tape withdrawing members. Also, since the large chamfer in which the chamfered amount is large and which serves to prevent damages of the magnetic tape at its edge is formed in part of the guide step, the width of the guide step is narrowed only in the region where the large chamfer is formed and, therefore, the magnetic tape can always run stably while being restricted in its position by the guide step.

Further, with the method of machining the tape guide on the lower drum of the rotary head drum according to the present invention, the large chamfer and the small chamfer can be both machined during the process of machining the tape running surface on the drum, resulting in simplified machining steps.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

We claim:

1. A rotary head drum comprising a rotary upper cylindrical drum and a fixed lower cylindrical drum coaxially arranged so as to face each other with a predetermined gap left therebetween, said lower drum having a tape guide which is provided with a guide step for restricting the running position of a magnetic tape in the direction of width thereof, a chamfer being formed in said guide step, wherein:

part of said chamfer formed in said guide step is formed as a large chamfer in which a chamfered amount is larger than that of the remaining part of said chamfer which is defined as a small chamfer, said large chamfer being located at a portion of the guide step which is overlapped by said magnetic tape during loading of said magnetic tape.

2. A rotary head drum according to claim 1, wherein said large chamfer is formed such that the chamfered amount is continuously changed at opposite ends of said large chamfer for smooth transition to the remaining small chamfer.

3. A rotary head drum according to claim 1, wherein the width of the guide step is about 0.15 mm, the chamfered amount of one side of the small chamfer is about 0.03 mm, and the chamfered amount of one side of the large chamfer is in a range of about 0.05 mm–0.15 mm.

4. A rotary head drum according to claim 1, wherein the width of the guide step is about 0.15 mm, the chamfered amount of one side of the small chamfer is about 0.03 mm, and the chamfered/amount of one side of the large chamfer is in a range of about 0.08 mm–0.15 mm.

5. A rotary head drum according to claim 1, wherein the width of the guide step is about 0.15 mm, the chamfered amount of one side of the small chamfer is about 0.03 mm, and the chamfered amount of one side of the large chamfer is in a range of about 0.11 mm–0.15 mm.

6. A rotary head drum according to claim 1, wherein the width of the guide step is about 0.15 mm, the chamfered amount of one side of the small chamfer is about 0.03 mm, and the chamfered amount of one side of the large chamfer is substantially 0.15 mm.

7. A rotary head drum according to claim 1, wherein the chamfered amount of one side of the large chamfer is in a range of 30%–100% with respect to the width of the guide step.

8. A rotary head drum according to claim 1, wherein the chamfered amount of one side of the large chamfer is in a range of 50%–100% with respect to the width of the guide step.

9. A rotary head drum according to claim 1, wherein the chamfered amount of one side of the large chamfer is in a range of 70%–100% with respect to the width of the guide step.

10. A rotary head drum according to claim 1, wherein the chamfered amount of one side of the large chamfer is substantially 100% with respect to the width of the guide step.

11. A rotary head drum comprising a rotary upper cylindrical drum and a fixed lower cylindrical drum coaxially arranged so as to face each other with a predetermined gap left therebetween, said lower drum including an outer peripheral surface having a first radius, and said lower drum including a tape running surface formed around a portion of said outer peripheral surface and having a second radius which is smaller than said first radius, a guide step formed between said outer peripheral surface and said tape running surface, said guide step having a width corresponding to the difference between said first radius and said second radius, a first chamfer formed along a portion of an outer periphery of said guide step and a second chamfer formed along a remainder of the outer periphery of said guide step, said large chamfer being at a portion of the outer peripheral surface which is overlapped by said magnetic tape during loading of said magnetic tape, said first chamfer reducing said width of the guide step by a first amount, and said second chamfer reducing said width of the guide step by a second amount which is less than said first amount.

12. A rotary head drum for an apparatus in which a magnetic tape is withdrawn from a cassette and wound over said rotary head drum during a loading procedure, and in which said magnetic tape is unwound from said rotary head drum and returned to said cassette during an unloading procedure, comprising:

a rotary upper cylindrical drum and a fixed lower cylindrical drum, said lower cylindrical drum including an outer peripheral surface having a first radius, and a tape running surface formed around a portion of said outer peripheral surface and having a second radius which is smaller than said first radius, a guide step formed between said outer peripheral surface and said tape running surface, said guide step having a width corresponding to the difference between said first radius and said second radius, a large chamfer formed along a contact portion of an outer periphery of said guide step, said contact portion being at an area of said outer peripheral surface which said magnetic tape overlaps during said loading and unloading procedures, and a small chamfer formed along a remainder of the outer periphery of said guide step, said large chamfer reducing said width of the guide step by a first amount, and said small chamfer reducing said width of the guide step by a second amount which is less than said first amount.

13. A rotary head drum according to claim 12, wherein the width of the guide step is about 0.15 mm, said small chamfer reducing the width of the guide step by about 0.03 mm, and said large chamfer reducing the width of the guide step by 0.05 mm–0.15 mm.

14. A rotary head drum according to claim 12, wherein the large chamfer reduces the width of the guide step by 30%–100%.

15. A rotary head drum according to claim 12, wherein the large chamfer reduces the width of the guide step by 50%–100%.

16. A rotary head drum according to claim 12, wherein the large chamfer reduces the width of the guide step by 70%–100%.

17. A rotary head drum according to claim 12, wherein the large chamfer reduces the width of the guide step by substantially 100%.

* * * * *